H. & J. SAUERBIER.
Rein-Rounding Machines.
No. 221,868.   Patented Nov. 18, 1879.
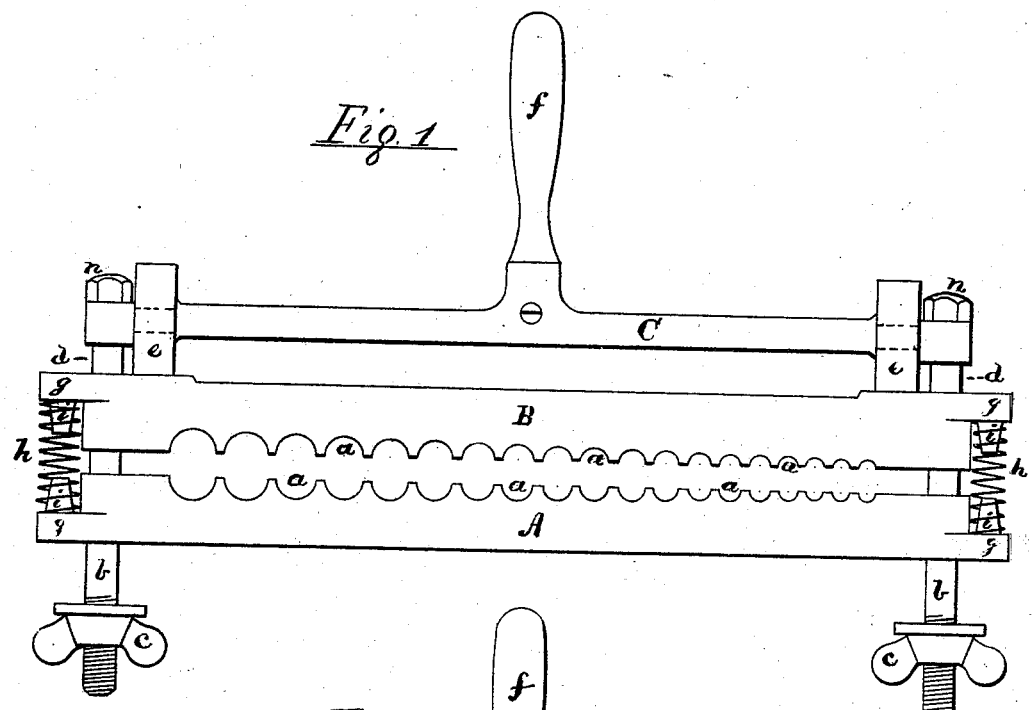
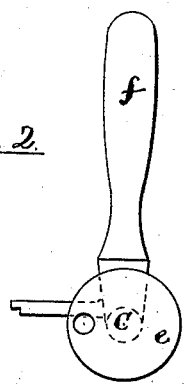
Attest.
Thos. S. Crane
Charles H. Pell
Inventor:
Henry Sauerbier,
Julius Sauerbier,
By Oliver Drake Atty.

UNITED STATES PATENT OFFICE.

HENRY SAUERBIER AND JULIUS SAUERBIER, OF NEWARK, NEW JERSEY.

IMPROVEMENT IN REIN-ROUNDING MACHINES.

Specification forming part of Letters Patent No. 221,868, dated November 18, 1879; application filed April 14, 1879.

*To all whom it may concern:*

Be it known that we, HENRY SAUERBIER and JULIUS SAUERBIER, both of the city of Newark, in the county of Essex and State of New Jersey, have invented certain new and useful Improvements in Rein-Rounding Machines; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to facilitate the operation of the machine, and to secure better results by overcoming certain objections existing in the machines heretofore employed.

The accompanying drawings illustrate the nature of the invention, in which Figure 1 is a front elevation, and Fig. 2 an end view, of a rein-rounding machine embodying our improvements.

Similar letters of reference indicating corresponding parts in each figure.

A and B in the drawings represent two metallic bars, each having a series of semicircular transverse grooves or notches, $a$, of varying sizes, formed in one of its edges, which, when said edges are brought into juxtaposition, form circular apertures, in and through which the reins are placed and drawn in the process of rounding.

In carrying out our invention, we provide the bar A, having the semicircular notches, as above set forth, with threaded shanks $b$ at or near each end, and thumb-screw $c$, by means of which the machine is secured to a bench or table, as indicated. Said bar A is also provided with posts or guides $d$, which serve to guide and hold the bar B in place when adjusted for operation, said bar B being provided with holes at or near its ends corresponding in size with said posts or guides $d$, as indicated in the drawings. Said guides are of a length sufficient to admit of the bar B being raised whatever distance may be required, in order to insert a rein or reins preparatory to being rounded, and also to afford space and bearings for the adjustment of a rod or bar, C, which is provided with an eccentric, $e$, at or near each end, by means of which said bar B is forced down upon the bar A, said rod C being provided with a handle, $f$, to facilitate the operation.

The bars A and B have projecting ends $g$, between which are adjusted springs $h$, which are held in position by hubs $i$, and serve to force the bars A and B apart automatically when the pressure upon them by the eccentrics is removed, as will be readily understood.

The guides $d$ are threaded and provided with nuts $u$, for the purpose of securing an exact adjustment of the eccentrics with relation to the bar B, which is necessary in order to force the bars tightly together and to insure good results.

It will be observed that the bar B will be parallel with the bar A, or nearly so, at all times, either in opening or closing them, which fact constitutes an important feature of the invention, as in the machines heretofore in use the bars are hinged at one end, and hence open somewhat like a pair of shears, and the pressure on the reins occasioned by such movement is not uniform, and is therefore very objectionable.

We are aware that leather-rounding machines have been made with two rolls operated by cog-wheels and a crank, and that the upper roll has a vertical adjustment by means of a screw and guides.

Having described our invention, what we claim as new, and desire to secure by Letters Patent, is—

1. In combination with the grooved bar A, the grooved bar B, guides $d$, passing through the ends thereof, and the pivoted bar C, with eccentrics $e$, adapted to act upon said bar B, substantially as specified.

2. In combination with the stationary grooved bar A and the grooved bar B, the hubs $i\ i$ and springs $h$, arranged between the two bars and over the hubs, as specified.

In testimony that we claim the foregoing we have hereunto set our hands and seals this 10th day of April, 1879.

HENRY SAUERBIER. [L. S.]
  JULIUS SAUERBIER. [L. S.]

Witnesses:
 OLIVER DRAKE,
 CHARLES H. PELL.